United States Patent [19]

Gilbert

[11] 4,141,333
[45] Feb. 27, 1979

[54] VALVE TRAIN SYSTEMS OF INTERNAL COMBUSTION ENGINES

[76] Inventor: Raymond D. Gilbert, 6501 Inwood Dr., Springfield, Va. 22150

[21] Appl. No.: 540,516

[22] Filed: Jan. 13, 1975

[51] Int. Cl.² ............................................. F02D 13/06
[52] U.S. Cl. .............................. 123/198 F; 123/90.16; 123/90.32
[58] Field of Search ............. 123/198 F, 90.32, 90.61, 123/90.62, 90.39, 90.47, 90.16

[56] References Cited

U.S. PATENT DOCUMENTS

| | | | |
|---|---|---|---|
| 2,091,451 | 8/1937 | Phillips | 123/198 F |
| 2,948,274 | 8/1960 | Wood | 123/198 F |
| 3,945,367 | 3/1976 | Turner | 123/198 F |
| 3,964,455 | 6/1976 | Brown | 123/90.16 X |

Primary Examiner—Ira S. Lazarus
Attorney, Agent, or Firm—Charles L. Gholz

[57] ABSTRACT

When individual cylinders of an internal combustion engine are disengaged from their power-consuming, power-producing role, engine efficiency at small to medium engine loads is improved significantly. This improvement is measured in enhanced fuel economy and reduced air pollutants from the engine's remaining active cylinders. Cylinders change from active to an inactive role as typical push rods and rocker arms of the valve trains are replaced with mechanisms which can hold selected intake valves closed and companion exhaust valves open continuously. Convertible valve trains change the power characteristics of cylinders in response to the remote operator's sensed conditions of load changes, special desired engine performance and desired fuel conservation.

14 Claims, 18 Drawing Figures

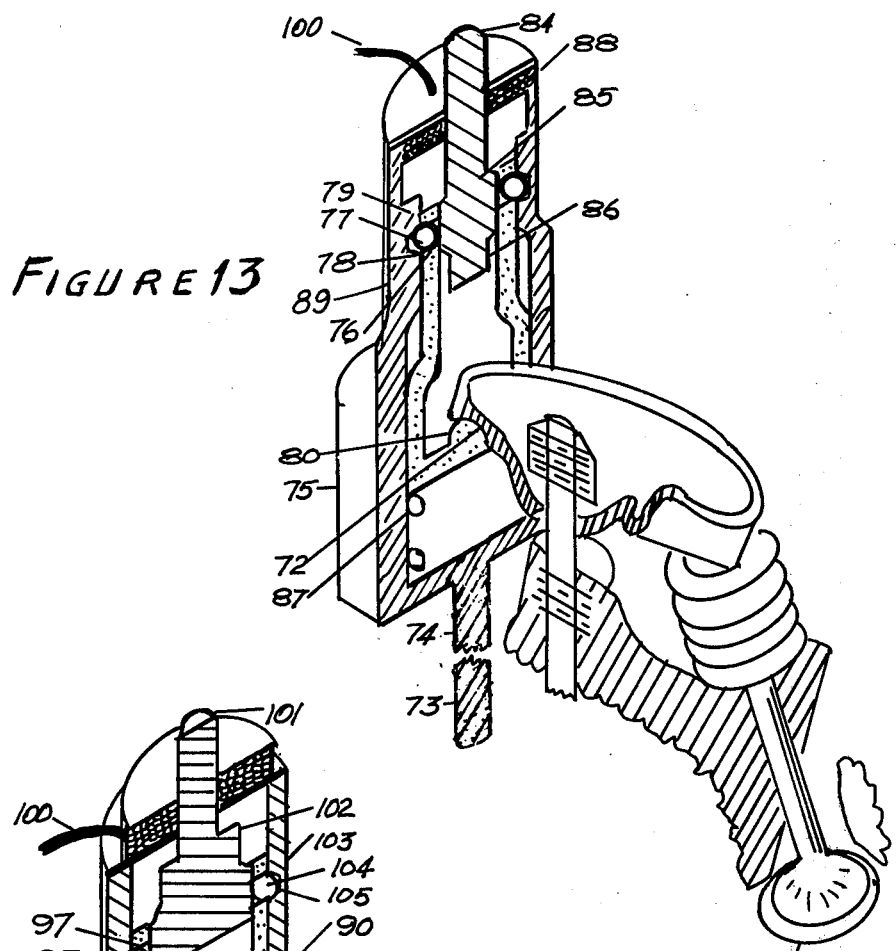
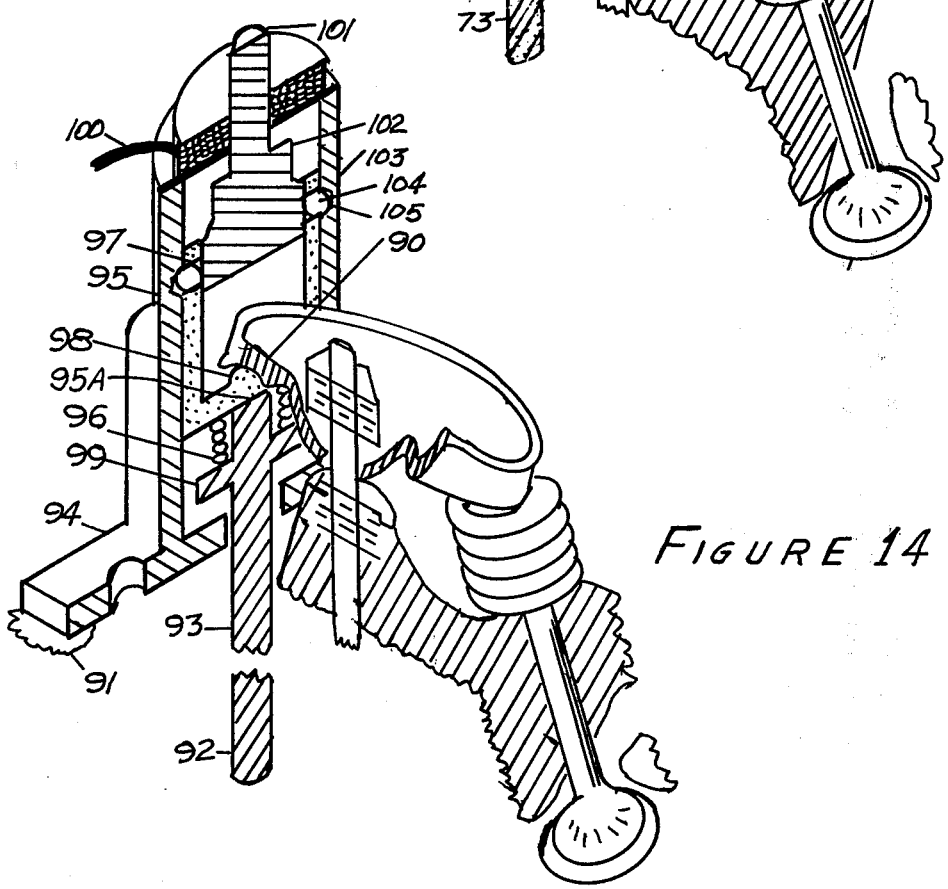

VALVE TRAIN SYSTEMS OF INTERNAL COMBUSTION ENGINES

OBJECTIVES

The objective of this invention is to permit owners of new and old American type automotive engines to benefit from fuel economies and reduced air pollution from split engine operation.

It is a further objective to disclose mechanisms that are adequately simple in their construction and installation that the cost of split engine conversion can be recovered from fuel cost savings in a short operating period.

It is an overall objective to make split engine operation realized to enough engine owners that the summation of their fuel conservation will be a significant contribution to the post 1973 International fuel crisis, and to the air pollution problem of most urban areas.

SUMMARY

Automobiles having large engines but consistently small to medium engine loads can benefit with significantly improved fuel economy after selected cylinders, usually every other numbered cylinder in the engine's firing order, are disengaged from their power-consuming characteristics. Automobiles and trucks whose engine loads periodically exceed half their engine's maximum capacity can benefit similarly when their operator or other sensor can select the appropriate power-capability and fuel-using rate of his engine. By remotely controlling the described convertible push rod and rocker arm mechanism within an engine, its operator can select the appropriate proportion of the full engine's capacity to meet needs dictated by peak loads, desired acceleration, desired engine braking, and desired fuel economy.

The sets of mechanisms described in this invention will hold the intake valve closed and the exhaust valve open for selected cylinders which have been committed to an inactive role during split engine operation. The closed intake valve prevents entry of fuel vapor and air from the intake manifold, thus minimizing the usual work of the cylinder's compression cycle, but retaining its vacuum pumping work. The open exhaust valve prevents the work of generating vacuum pressures during the intake cycle and combustion cycle of a completely throttled cylinder.

The cylinders that remain active during split engine operation also contribute to the engine's improved efficiency because in compensating for the inactive cylinders, they will be supplied with more air and fuel vapor for each firing cycle, thus improving the average compression ratio with attendant better thermal efficiency (and complete combustion) that is characteristic of internal combustion engines at high load conditions.

This invention conserves fuel because it permits reduction in the capacity of engines when their total capacity is not needed. It reduces air pollution by excluding fuel vapor from the exhaust emissions of inactive cylinders. It improves engine starting conditions by eliminating the power-consumption characteristics of the inactive cylinders, and it can enhance the full engine braking characteristics that are important to vehicle control.

PRIOR ART

The prior art relating to this invention includes split engine operation, push rods with optional lengths, and rocker arms with controllable angles.

Valve actuating mechanisms with variable length characteristics were patented before 1900. These early push rod mechanisms demonstrated that even without a half-speed cam shaft, it was possible to open and close a 4-cycle engine's valves from an eccentric action on the engine's crankshaft, provided that the push rods were stiff on each cycle requiring valve opening and the push rods were weak (or disengaged) on each cycle requiring a closed valve. About 1920 some single cylinder engines used a "hit-or-miss" system in which a push rod held a valve open whenever the engine speed exceeded the governor's intended speed.

With the popularity of overhead valve engines since the 1930's, came the accoustic irritation of "tappet noise." Push rods, that were adjusted to their rocker arms for adequate valve seating at engine operating temperature, would shrink in length after cooling. This shorter rod would strike the rocker arm from a distance at each valve action with noisy effect. The hydraulic valve lifters of Voorhies (U.S. Pat. No. 2,682,865) and others, overcame this deficiency for the most part, but many spring-absorbing mechanical approaches were patented to minimize tappet noise. e.g. Moyer, U.S. Pat. No. 2,927,566, 1960.

The long slender column of modern push rods offers a bending failure mode to protect other elements of the valve train. Minder proposed a diesel engine push rod that would shorten temporarily under unplanned obstructions of the exhaust valve, but would return to full length when the valve worked freely again. Minder, U.S. Pat. No. 2,678,033, 1954.

Cam variations have been offered to improve engine performance. Rohlin, U.S. Pat. No. 2,205,814 in 1941 and later Weiss U.S. Pat. No. 2,528,983, 1950, modifield cam-related mechanisms to continuously close the intake valves and continuously open the exhaust valves of selected cylinders to demonstrate optimum efficiency in split engine operation.

Winkler U.S. Pat. No. 2,654,038, 1953 described a hydraulic valve lifter that collapsed to hold valves closed on operator signal. Wood held the exhaust valve fully open with a solenoid-driven latch mechanism which holds the hydraulic valve lifter at its maximum upward travel position. e.g. Wood U.S. Pat. No. 2,948,274, 1960.

Between 1952 and 1973 Snyder, Rohlin, Dolza, Mick, and Francis patented adaptations of split engine control using a simple intake manifold throttling action to the four cylinders of a V8 engine that share a common intake manifold passage system. They did not change the normal intake or exhaust valve patterns.

Special cam actions have been used to hold valves open for easier starting practices on both gasoline and diesel engines. Cams have modified normal valving patterns to enhance engine peak performance, to compress air and to enhance the engine's braking capacity. Special exhaust valve cams prevent runaway destruction of diesel engines.

In general, cam systems to achieve split engine operation have been too complicated to win broad commercial success. The fuel and air throttling of intake passages dedicated to half the cylinders in a V8 engine threatens to consume unacceptable amounts oil from worn engines and to contribute unsatisfactorily to air pollution, even though it offers fuel economy and very simple installation. Only Rohlin, U.S. Pat. No. 2,250,814, 1941 innovated with push rods in an approach to split engine operation with closed intake valves and open exhaust valves. His means for positioning the push rods involved high cam forces driven by hydraulic power. No prior art or patent action appear to have utilized the valve train's inherent energy system to position both intake and exhaust valves for split engine operation.

FEATURES

The novelty of this invention is characterized by the simplicity of replacement push rod or rocker arm mechanisms, the operational flexibility of the mechanisms, the easy accessability of the parts to be replaced, and the potential application of these parts to the great population of new and old engines for automobiles and trucks. As a byproduct of having such push rods or rocker arms installed in his vehicle, an owner can benefit from unique engine starting, engine stopping, and engine braking characteristics brought about by the operator's positive control of valve actions. The environment can benefit to the extent that the operator uses closed-valve engine braking to reduce unburned hydrocarbons from his exhaust emissions.

The utility of the invention and its timeliness are related to major changes in fuel economics of engine operation before and after the fall of 1973. Engines designed and built before that year for American customers were generally sized to offer impressive initial acceleration through the few gear ratios of an automatic transmission. They were also sized to offer the capability of maintaining high sustained highway speeds. Fuel costs represented a small proportion of total annular vehicle costs, even though the large capacity engines have high fuel consumption rates whether loaded or idling. By 1974 fuel costs increased more than 50% and are not expected to decline. A National speed limit of 55 MPH has minimized one significant reason for large capacity engines on automobiles. The ease of installing special push rods or rocker arms on new and used engines makes it possible to conserve significant petroleum by broad application of split engine operation.

DESCRIPTION

Definition of Figures

FIGS. 1, 2, 13, 14, 15 and 16 describe a convertible length valve train members which permit operator or sensor controlled split engine operation and other unusual remotely-controlled engine behavior.

FIGS. 4, 5, 8, 9, 10 and 11 describe flexible length valve train members which permit sustained split engine operation with minimum change to engine mechanisms.

Figure 4:
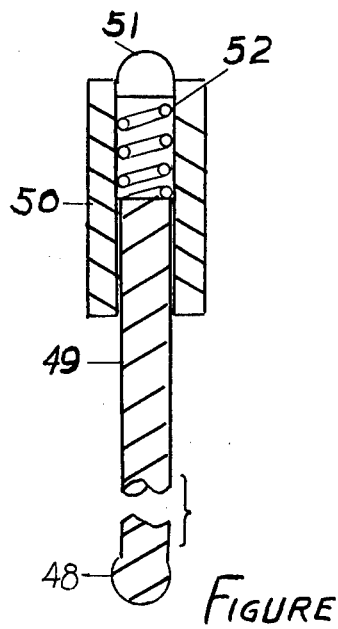

FIG. 4 is a sectional view of a flexible push rod for an intake valve train. When substituted for a fixed length push rod, this device retains all other elements of the valve train in their customary locations, but permits the intake valve to remain closed at all times.

Figure 5:
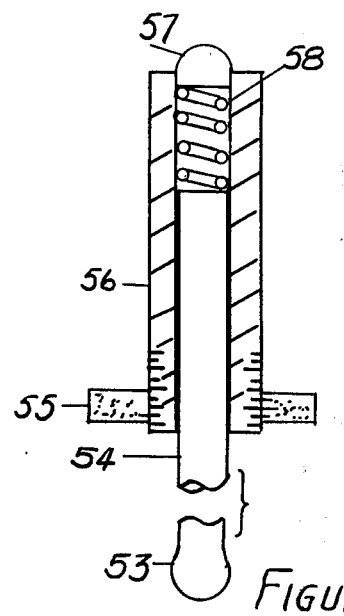

FIG. 5 is a sectional view of a fixed height, flexible push rod for the exhaust valve train. When substituted for a fixed length push rod, this device retains all other elements of the valve train in their customary locations, but holds the exhaust valve open at all times.

Figure 6:
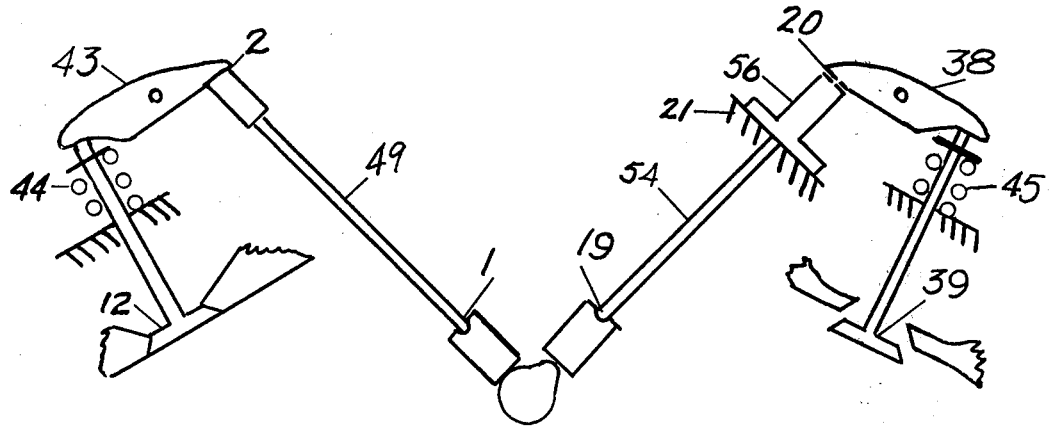

FIG. 6 is a fragmentary sectional view of the valve trains in a V8 engine, showing the location of the flexible push rod for the intake valve train on the left side and the location of the fixed height, flexible push rod for the exhaust valve train on the right side.

Figure 1:
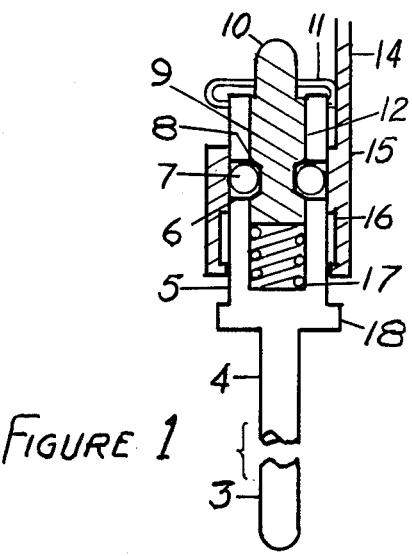
FIG. 1 is a sectional view of a convertible valve closing (intake) push rod showing its locked position in which it performs as if it were a solid push rod.
Figure 2:
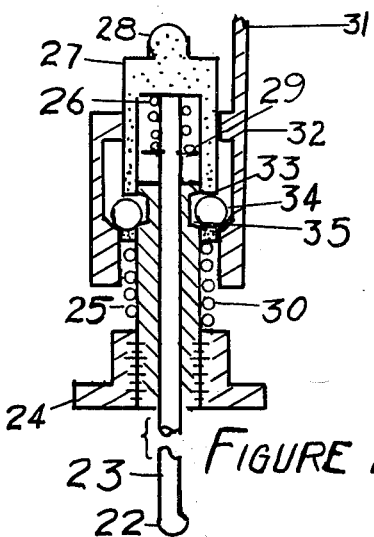
FIG. 2 is a sectional view of a convertible valve opening (exhaust) push rod at its sustained maximum height position.
Figure 7:
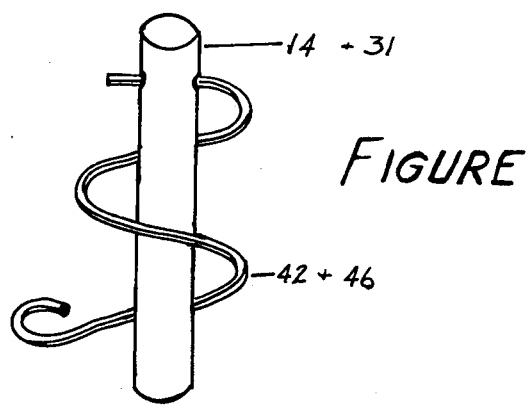

FIG. 7 is an isometric view of a spring form suitable for engaging and disengaging a convertible clutch. As shown in FIGS. 1 and 2.

Figure 8:
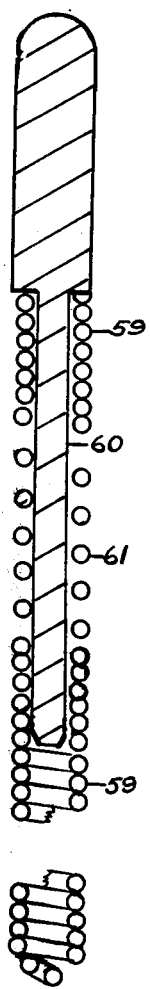

FIG. 8 is a sectional view of an alternative embodiment of the flexible push rod for the intake valve train.

Figure 9:
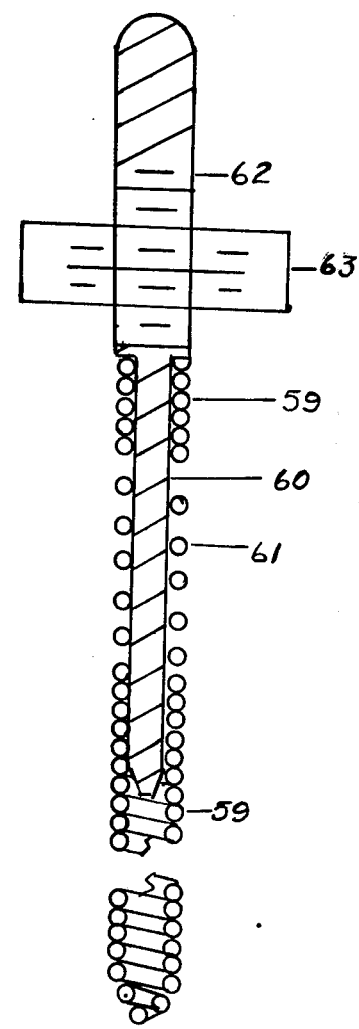

FIG. 9 is a sectional view of an alternative embodiment of the fixed height, flexible push rod for the exhaust valve train.

Figure 10:
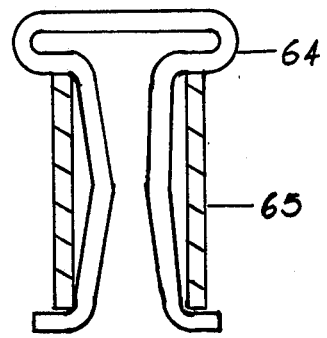

FIG. 10 is a sectional view of a cylindrical plug and spring clip assembly to replace hydraulic valve lifters for inactive valve trains.

Figure 11:
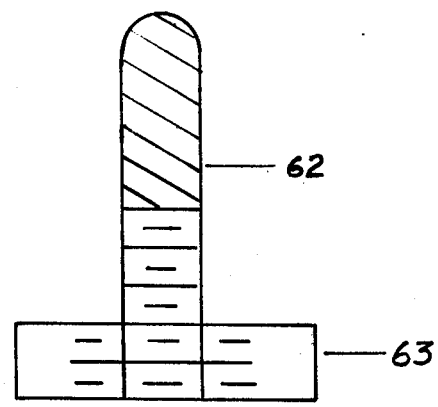

FIG. 11 is a sectional view of a fixed height standoff for deflecting the rocker arm of the exhaust valve and holding that valve open. It is employed in conjunction with the assembly of FIG. 10.

Figure 12:
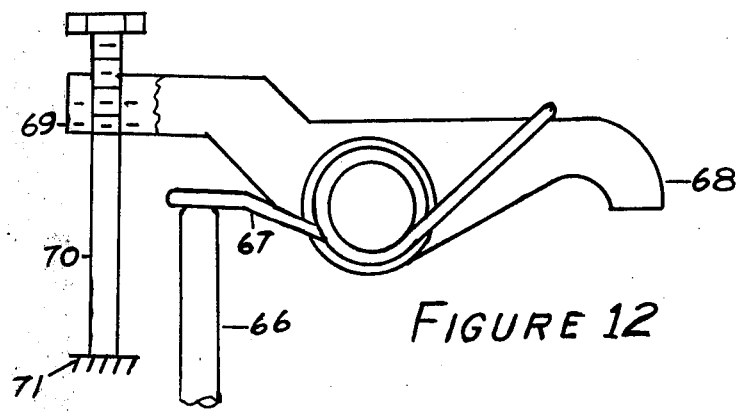

FIG. 12 is a fragmentary sectional view of a rocker arm having the capacity to serve in either intake valve trains or exhaust valve trains to hold valves continuously open or continuously closed.

FIG. 13 is a fragmentary isometric-sectional view of a convertible closed valve (intake) push rod assembly which embodies the principles of the device in FIG. 1. As shown, the convertible push rod is in its locked position in which it performs as if it were a solid push rod.

FIG. 14 is a fragmentary isometric-sectional view of a convertible open valve (exhaust) push rod assembly which embodies the principles of the device in FIG. 2. As shown, the convertible push rod is in its locked position in which it holds the exhaust valve open continuously.

Figure 15:
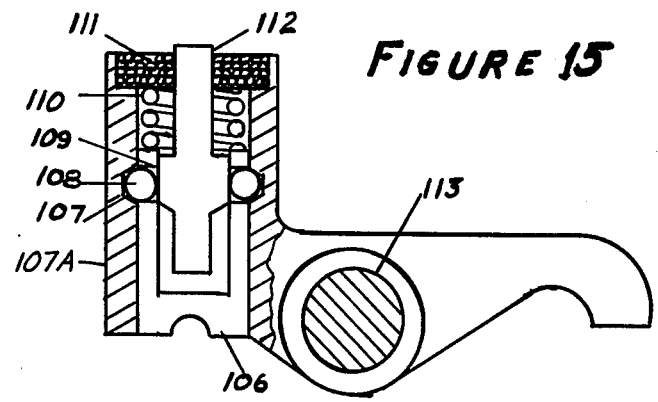

FIG. 15 is a fragmentary sectional view of a convertible closed valve (intake) rocker arm whose convertible clutch embodies the principles illustrated in FIGS. 1 and 13.

Figure 16:
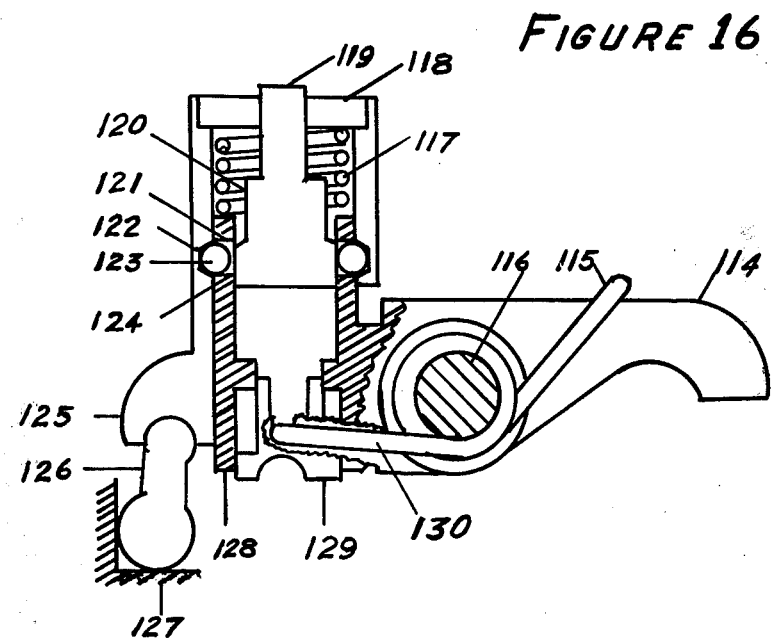

FIG. 16 is a fragmentary sectional view of a convertible open valve (exhaust) rocker arm whose convertible clutch embodies the principles illustrated in FIGS. 2 and 14.

Figure 17:
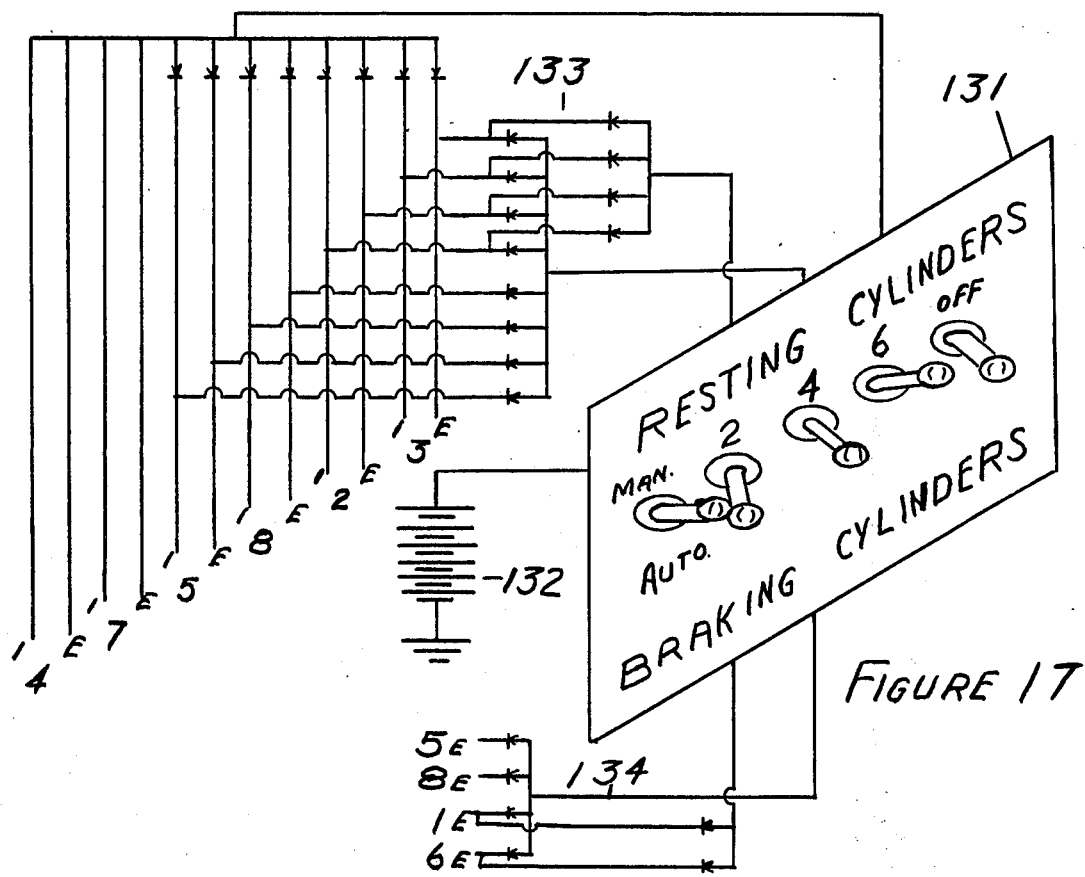
Figure 18:
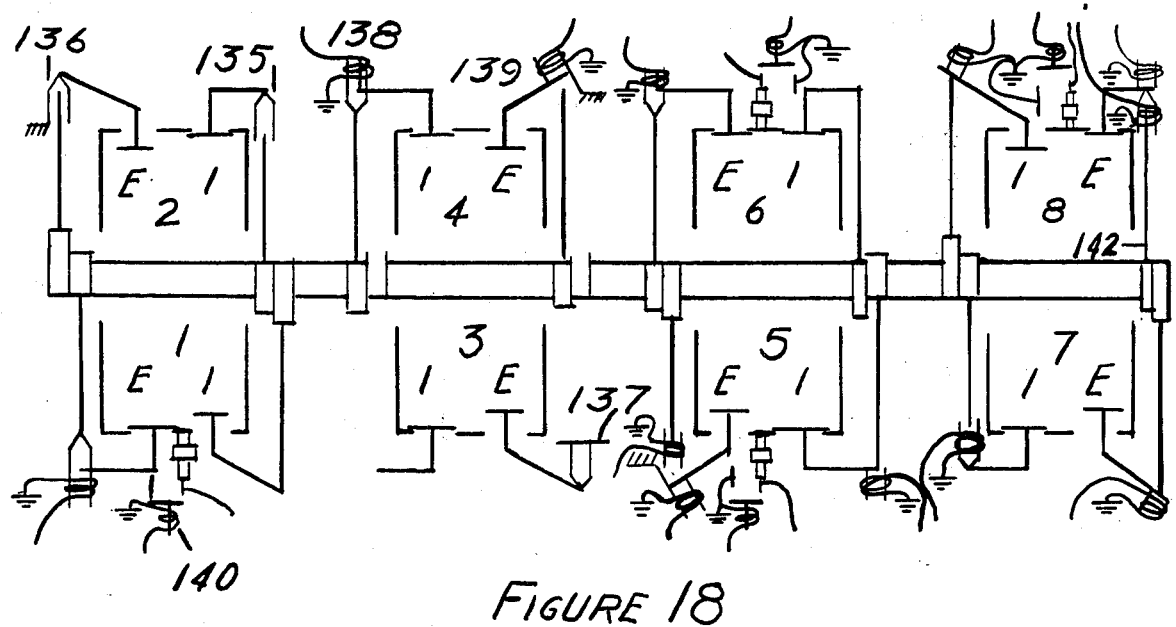

FIGS. 17 and 18 describe an operator's electric control switches, their diode signal-mixing circuits, and the results of these commands as they affect the valve train system of a typical V8 engine.

OPERATION OF DEVICES

The convertible closed valve (intake) push rod mechanism of FIG. 1 replaces the fixed-length push rod in the intake valve train. Its bearings interface with the hydraulic valve lifter's bearing seat (1) and the intake rocker arm bearing seat (2) as shown on the left side of FIG. 3.

The parts and their operation in a convertible intake push rod are described as follows: A bearing (3) forms the bottom of a solid or hollow rod (4) which is topped by a perforated cup (5). Round perforations in the wall of the cup (6) hold steel balls (7) which also share space in the side groove (8) around the piston (9). A bearing (10) on the top of the piston (9) fits into the rocker arm (43) at its push rod bearing seat (2). This push rod and rocker arm train actuate the intake valve (12) in response to cam (13) and valve spring (44) forces. The clutch control ring (15) moves the steel ball (7) according to the height position of the control ring as transmitted through the operator shaft (14).

The convertible closed valve (intake) push rod remains solid as long as the operator shaft (14) holds the minimum diameter surface of the clutch control ring (15) in contact with the steel balls (7). However, when the maximum inside diameter surface (16) of the clutch control ring is held at the level of the perforations (6), the balls will be pressed out of the piston (9) side grooves (8), allowing the basic structure (3, 4, & 5) to respond to the linear oscillating pattern driven by the operating cam shaft (13) and return spring (17), while the piston (9) and rocker arm (43) remain stationary. In the highest operator shaft position the intake valve (12) is continuously closed.

The bottom block (18) limits maximum downward travel of the clutch spring (15) and the optional spring clip (11) constrains upward travel of the spring-driven piston (9) during installation and maintenance.

The convertible exhaust push rod mechanism of FIG. 2 replaces the fixed length push in the intake valve train. Its bearings interface with the hydraulic valve lifter's bearing seat (19) and the exhaust rocker arm bearing seat (2), and its compression member rests on a static engine surface (21) as shown on the right side of FIG. 3.

The parts and their operation in a convertible exhaust push rod are described as follows: A bearing (22) forms the bottom of a solid or hollow center rod (23) which passes through a compression standoff composed of a threaded surface nut (24) and its companion threaded static tube (25). The center rod (23) applies compressive force through spring (26) and directly against the bottom of the perforated wall cap (27). This cap's top surface includes the upper load-transmitting bearing (28). This cap's bottom edge surface presses against compression spring (30) which holds the compression standoff (24 & 25) firmly against a static surface (21) on the engine.

The inner spring (26) remains compressed between the cap and the center rod's washer (29) as long as the operator's shaft (31) lowers the exhaust clutch control ring (32) to a level where its maximum inside diameter is opposite the perforations (33) of the cap's walls. At this position the steel balls (34) will remain free of the radial groove (35). The top bearing (28) will faithfully transmit the force and movement of the bottom bearing (22) to drive the exhaust valve (39) in response to cam (13) and valve spring (45) forces.

When the bell crank (41) and spring (46 of FIGS. 3 and 7) or a solenoid lifts the clutch ring (32) synchronously with the cap's (27) upward cam-driven movement, the minimum inside diameter of the clutch ring (32) will press the steel balls (34) to fit partially within the radial groove (35) of the static tube (25), holding the cap (27) and its top bearing (28) at its maximum cam-driven height. Inside the cap (27) the spring (26) exerts a downward force to keep the bottom bearing (22) in mechanical contact with its seat (19) in the tappet or hydraulic lifter. The result of the change in bell crank (41) angle has been to stop oscillation of rocker arm (38) and to hold the exhaust valve (39) continuously in its open position.

Figure 3:
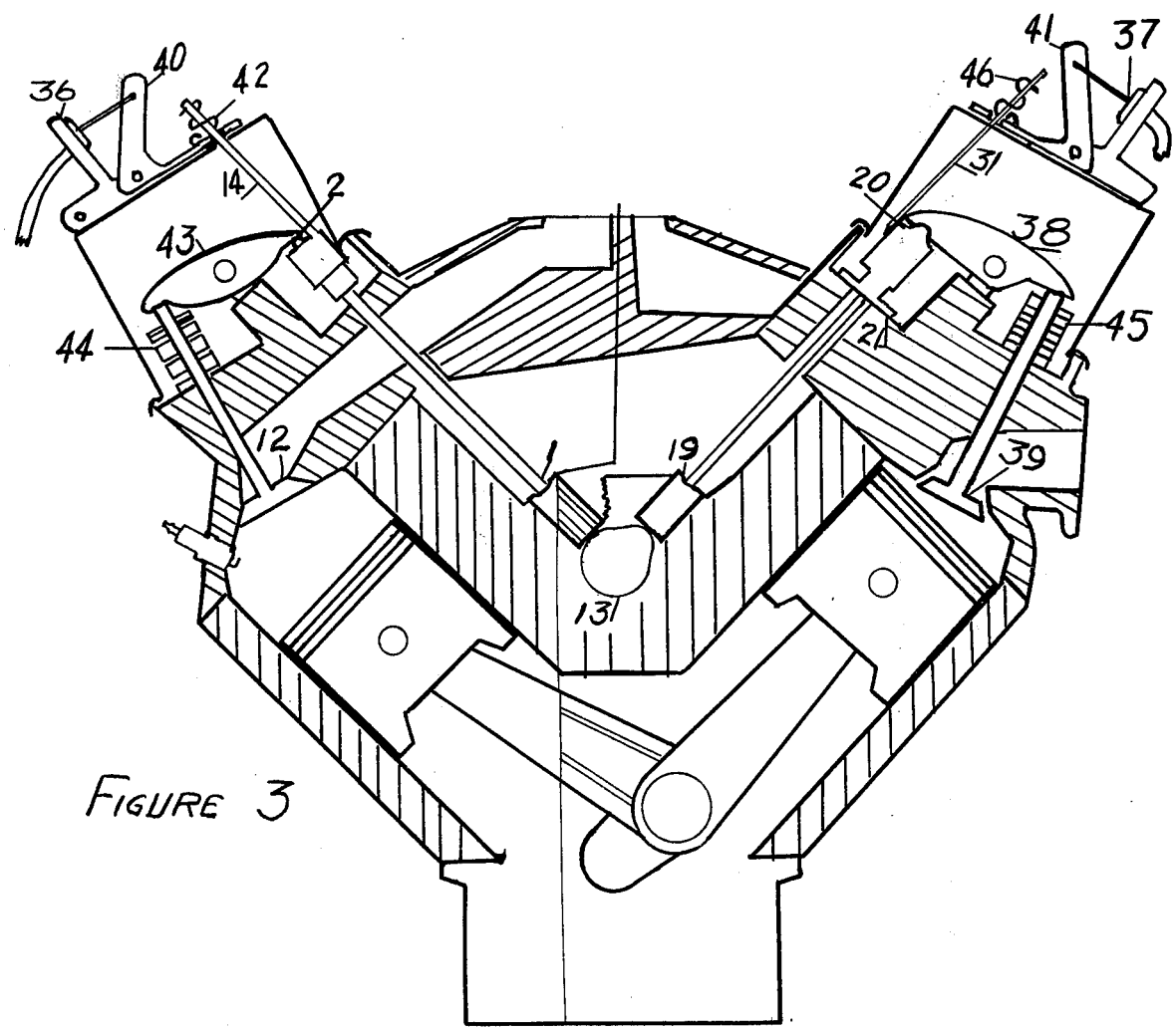
FIG. 3 is a fragmentary sectional view of a V8 engine, wherein a typical intake valve train is illustrated on the left side of the engine and a typical exhaust valve train is illustrated on the right side of the engine.

FIG. 3 illustrates means to actuate operator control rods (14 & 31) using bell crank mechanism (40 & 41) and spring arrangements (42 & 46) in conjunction with cable controls (36 & 37), mechanical linkage, vacuum actuators, or solenoids with sensor or driver actuation.

FIGS. 4 and 8 describe flexible length closed valve replacements for push rods where it is desirable to deactivate one or more cylinders, using simple engine maintenance to deactivate or reactivate each cylinder. FIG. 4 is described as follows: A bearing (48) forms the bottom of a rod (49) which slides inside a tube (50) that is capped with a bearing (51). A spring (52) within the tube presses both bearings against their interface bearing seats (1 & 2), but with insufficient force to open the intake valve (12).

FIGS. 5 and 9 describe fixed height, flexible length open valve replacement for exhaust push rods where it is desireable to deactivate one or more cylinders using simple engine maintenance to deactivate or reactivate. FIG. 5 is described as follows: A bearing (53) forms the bottom of a rod (54) which slides inside the tube (56) that is capped with a bearing (57). A spring (58) within the tube presses both bearings against their interface bearing seats (19 & 20), and a compression member threaded nut (55) fits the threaded base of tube (56) to fit against a static engine surface (21). Adjustment of the nut permits the top bearing to lift the rocker arm (38), depressing the exhaust valve (39) permanently to an open position. Subsequent replacement of the fixed length push rod permits the rocker arm and exhaust valve to resume their normal oscillating action.

FIG. 7 illustrates a spring (42 & 46) with sufficient stored energy and elasticity to hold a sensor's desired operating position and to transmit that desired position of the operator rod on either the convertible exhaust push rod or convertible intake push rod to its slutch ring at the instant conversion will naturally occur.

FIG. 8 illustrates another embodiment of the principal elements of FIG. 4. It uses a continuous spring (59) and a rod-guide (60) to form its structure. An uncompressed portion (61) offers the necessary linear compression at a force insufficient to open the valve.

FIG. 9 shares the elements cited in FIG. 8, plus an extension of the inner guide rod to serve as a stand-off for the exhaust valve. The threaded portion of the rod (62) and a threaded nut (63) can be adjusted for continuous opening of the exhaust valve.

FIG. 10 illustrates a spring held tube to control the oil flow in the absence of a hydraulic valve lifter. Tube (65) offers resistance to the flow of oil normally delivered to the hydraulic valve lifter. Spring (64) holds tube in cylinder cavity for hydraulic valve lifter. Use of this device permits complete removal of the hydraulic valve lifters and push rods for cylinders to be deactivated. Complete deactivation of a cylinder will also use a device typical of FIG. 11 which employs a standoff (62) and possibly a matched threaded adjustment nut (63).

FIG. 12 illustrates a common type of rocker arm (68) adapted for split engine operation. It holds the solid push rod (66) in place, allowing the normal oscillating motion of the bottom portion of the valve train to work against the torque moment of the spring (67) which is not sufficient to open the intake valve. The same rocker arm (68) and spring assembly (67) can be used in the exhaust valve train. Spring (67) holds a torque moment to retain the solid push rod and hydraulic valve lifter to their working positions, however the threaded adjustment (69) and stand off rod (70) exert a torque moment against the static engine surface (71) to deflect the rocker arm and hold the exhaust valve open continuously.

FIG. 13 is an embodiment of the principles illustrated in FIG. 1, but the mechanisms have been inverted to permit use of additional engine space above the rocker arm. The following charts compare the illustrative numbers from FIGS. 1 and 3 with the illustrative numbers from FIG. 13.

| FIG. 1&3 | FIG. 13 | FIG. 1&3 | FIG. 13 | FIG. 1&3 | FIG. 13 |
|---|---|---|---|---|---|
| 3 | 73 | 7 | 77 | 14 | 84 |
| 4 | 74 | 8 | 78 | 15 | 85 |
| 5 | 75 | 9 | 79 | 16 | 86 |
| 6 | 76 | 10 | 80 | 17 | 87 |

The parts and their operation as a convertible closed valve (intake) push rod mechanism are described as follows: A bearing (73) forms the bottom of a solid or hollow rod (74). The top of the rod becomes split and the side arms (75) extend the basic push rod into an outside cylinder (89). As shown a perforated tube (79) fits within the cylinder (89) and holds the top bearing (80) in tension, when steel balls (77) are pressed partially out of the perforations (76) into the inner groove (78) of the outside cylinder (89) by the maximum diameter (85) of the center spool (85). As long as control rod (84) is at its bottom-most position the convertible push rod will maintain this fixed bearing-to-bearing length.

When electrical energy activates the solenoid (88) or other upward force moves the control rod (84) upward, the steel balls (77) are pressed out of their groove (78) instead sharing room inside the minimum diameter (86) of the center spool. In this condition the oscillating motion of bearing (73) is absorbed and returned from the spring (87), which has insufficient strength to offset the force of the intake valve spring. Until the control rod (84) is dropped downward, the intake valve (82) will remain closed.

FIG. 14 is an embodiment of the principles illustrated in FIG. 2, but as in FIG. 13, the mechanisms have been inverted to permit use of the additional engine space above the rocker arm. The following charts compare the illustrative numbers of the FIG. 2 and 3 against the numbers for similar function on FIG. 14:

| FIG. 2&3 | FIG. 14 | FIG. 2&3 | FIG. 14 | FIG. 2&3 | FIG. 14 |
|---|---|---|---|---|---|
| 20 | 90 | 25 | 95 | 31 | 101 |
| 21 | 91 | 26 | 96 | 32 | 102 |
| 22 | 92 | 27 | 97 | 33 | 103 |
| 23 | 93 | 28 | 98 | 34 | 104 |
| 24 | 94 |  |  | 35 | 105 |

The parts and their operation as a convertible open valve (exhaust) push rod mechanism are described as follows: A bearing (92) forms the bottom of a solid or hollow rod (93) on which is attached a push rod washer (99) which drives a return spring (96). The top surface of the rod (95A) presses against the bottom of the top-bearing strap (98). It, in turn applies compressive forces to the rocker arm bearing interface (90). The top bearing strap (98) supports a perforated tube (97) in whose perforations (103) steel balls (104) may rest idly when the spool (102) minimum diameter is opposite the tube perforations (103). As shown, however, when the control shaft (101) is drawn upward with forces from a solenoid (100) or spring forces such as those illustrated in FIG. 7, the steel balls are pressed by the maximum diameter of the spool (102) into the groove (105) within the outside cylinder (95) which is integrated into a stand (94). Thus the full return force of the exhaust valve spring is transmitted through the locked exhaust clutch to a static surfce (91) of the engine. When the control rod (101) is lowered again and the push rod (93) makes a contact with the top bearing strap, the subsequent relaxation of the forces of the steel balls (104) will let them be pressed out of the groove (105), permitting response motions.

FIGS. 13 and 14, in showing both the convertible push rod and a rocker arm in the same view illustrate the close interaction of these two elements in each valve train.

FIG. 15 is an embodiment of the principles illustrated in FIGS. 1 and 13 but the mechanisms have been adapted to the rocker arm element of the intake drive train. The parts and their operation as a convertible closed valve (intake) rocker arm mechanism are described as follows: An interface bearing of the rocker arm forms the bottom of a perforated cup (106) fitting within a cylindrical passage of the rocker arm (113) structure. An inner groove (107) in a compressive load bearing member 107A carried fixedly by the rocker arm accepts a portion of the steel ball (108) as it is moved within the cap perforation (109) by the control rod and spindles (112). In this position of the steel ball the convertible rocker arm transmits push rod motion to the valve. Solenoid (111) or outside mechanical actuators can lift the control rod and spool (112) to where the steel balls are pressed out of groove (107) to share the chamber space beside the small diameter section of the spindle and control rod (112). In this condition the perforated cap (106) moves upward against the spring (110) when pressed by the push rod, and is returned by the spring pressure as the push rod oscillates downward, offering an insufficient torsional moment to deflect the intake valve to its open position. It remains closed continuously.

FIG. 16 is an embodiment of the principles illustrated in FIG. 2 and FIG. 14, but the mechanisms have been adapted to the rocker arm element of the exhaust drive train. The parts and their operation as a convertible open valve (exhaust) rocker arm mechanism are described as follows:

Around a fulcrum shaft (116) rocker arm (114) rotates in oscillating motion, driven by the push rod bearing interface segment (129) in cylinder (128). The perforated cylinder (128) is integral with rocker arm frame (114). An outer cylinder (125) is supported by a compression bar (126) to the static engine surface (127). A groove (122) within outer cylinder (125) accepts a portion of the steel ball (123) housed within perforation (124) whenever the maximum diameter (121) of the control spindle is opposite the perforations (124) of cylinder (128).

In the position shown, a prior oscillation of the push rod has rotated the rocker arm to depress and open the exhaust valve spring. At that instant the steel balls (123) entered the outer ring groove (122) to hold one end of the rocker arm (128) in an elevated position while the other end of the rocker arm (114) pressed the valve continuously open. Immediately the prestressed spring (130), which is not as strong as the valve spring, depressed the bearing interface segment (129) to follow the oscillating motion of the push rod.

With a lowering of control rod (119) by electrical signal of the solenoid (118) or other actuation, a smaller spindle diameter (120) will permit the steel balls (123) to be expelled from their groove (122). This action will occur when the forces on all parts are relaxed during the maximum upper stroke of the push rod oscillating motion. Then the cylinder section (128) will remain in compressive contact with bearing segment (129). Spring (130) will stop its relative motion, but spring (117) in tension, will hold the outer cylinder in sustained compression against the static engine surface.

FIG. 17 illustrates an operator control (131) for electric circuits which modify valve train actions to permit split engine operation and engine braking. Using a battery (132) as prime electric DC power, the typical diode network (133) permits multiple switches to control defined combinations of solenoids for varying levels of split engine operation. The lower portion of FIG. 17 shows a fragmentary diode network (134) for control of engine braking. The operator control shows an automatic option that is cited in other patents.

FIG. 18 is a diagram of a valve train with split engine and compression braking characteristics. Cylinder 2 has been committed to an inactive status using intake flexible length valve train device (135) described in FIGS. 4 and 8 and exhaust valve train device (136) described in FIGS. 5 and 9. Cylinder 3 also has been committed to inactive status with complete elimination of its push rods and hydraulic valve lifters, fitting the lifter cavities with devices cited in FIG. 10, and lifting the exhaust rocker arm with a standoff (137) cited in FIG. 11. In this committed condition neither cylinder 2 nor 3 are fitted to use the electric circuits described for them in FIG. 17. The valve trains of cylinders 4 and 7 are fitted with convertible split engine devices. The convertible closed valve push rod device (138) on the intake valve train is described in FIG. 13. It is designed for push rod displacement where the space between the rocker arm and engine are insufficient for use of device in FIG. 1 fitted with a solenoid control. The convertible open valve rocker arm device (139) for the exhaust valve train is described in FIG. 16.

The valve trains of FIGS. 1 and 6 are fitted with an engine braking system which utilizes an ignition shunt (140) and a convertible closed valve positioner device (138). The intake valve operates in direct response to the cam-driven actions of the valve train. When the engine brake is actuated the ignition becomes non operative, and the intake charge is compressed without firing; is compressed again in the normal exhaust stroke, and may expel some of its headed gases into the intake manifold before drawing cool gases for two more compression strokes.

The valve trains of FIGS. 5 and 8 provide the flexibility of operating as active cylinders, as inactive (split engine) cylinders, or as brakes. The intake valve train is fitted with a convertible closed valve rocker arm device (141) of the type cited in FIG. 15. The exhaust valve train is fitted with a convertible open valve rocker arm device (139) plus a convertible closed valve push rod device (142) such as the device in FIG. 1 fitted with a solenoid actuator for its control rod. This convertible closed valve device when set for closed valve will not over ride the open valve devices, but must be switched in sequence.

I claim:

1. A multi-cylinder internal combustion engine comprising:

(a) at least one cylinder having an intake and an exhaust port, the opening and closing of which are controlled by valve trains including an intake pushrod and an intake valve and an exhaust pushrod and an exhaust valve, respectively, each said pushrod comprising two coaxial sections, one of which is telescopically received within the other, and said pushrods and said valves being operatively connected by a rocker arm which is pivoted about a single fixed axis; and (b) means for axially varying the effective length of a first pushrod in order to hold the operatively connected valve of said cylinder closed continuously, said means being operable to selectively hold the two coaxial sections of said pushrod in axially fixed maximum-length relationship or to permit relative axial movement, whereby said cylinder may be prevented from passing any vapors through said valve port.

2. The engine of claim 1 and further comprising means for axially varying the effective length of the other of said pushrods in order to hold the other of said valves of said cylinder open continuously.

3. A multi-cylinder internal combustion engine comprising:

(a) at least one cylinder having an intake and an exhaust port, the opening and closing of which are controlled by valve-springs and cam-drivn valve trains, including an intake pushrod and an intake valve and an exhaust pushrod and an exhaust valve, respectively, said exhaust pushrod comprising two coaxial sections, one of which is telescopically received within the other, said exhaust pushrod and said exhaust valve being operatively connected by a rocker arm which is pivoted about a single fixed axis;

(b) pushrod means for axially varying the end-to-end length of said exhaust pushrod; and (c) pushrod means for transferring said valve springs' compressive load through the top section of said exhaust pushrod, and onto said cylinder in order to hold said exhaust valve of said cylinder open continuously, whereby said cylinder is prevented from performing any work of air compression.

4. A multi-cylinder internal combustion-engine (a) wherein each cylinder has an intake port and an exhaust port, the opening and closing of which are controlled by a valve and valve train including a valve spring, a cam shaft, a tappet actuated by said cam shaft, a push rod, and a rocker arm actuating said pushrod and pivoted about a single fixed axis;

(b) wherein said valves for said intake and exhaust ports are actuated by said pushrods for intake and exhaust valve trains, respectively;

(c) wherein said valves are held closed by said valve spring until a greater force is applied through the associated rocker arm;

(d) wherein a first pushrod means for holding the valves of at least one selected cylinder continuously closed is provided;

(e) wherein a second pushrod means for optionally holding the exhaust valve of said cylinder continuously open is provided, whereby that cylinder may be prevented from performing any work of air compression;

(f) wherein said pushrods comprise two coaxial components;

(g) wherein said first pushrod means are operable to selectively hold the two coaxial components of said pushrods in axially fixed relationships or to permit relative axial movement; and (h) wherein said second pushrod means are operable to hold the upper component of said pushrod in a fixed position, in relation to said cylinder, thus holding the valve open, whereby said cylinder is prevented from performing any work of air compression.

5. A multi-cylinder internal combustion engine wherein:

(a) at least one cylinder having an intake port and an exhaust port the opening and closing of which are controlled by a valve train including an intake valve and an exhaust valve, respectively, a cam shaft, an intake push rod and an exhaust push rod actuated by said cam shaft, and a rocker arm actuated by each of said push rods;

(i) said intake and exhaust valves are actuated by said intake and exhaust push rods, respectively;

(ii) said valves are held closed by a valve spring until a greater force is applied through the associated rocker arm;

(iii) said push rods comprise two coaxial components;

(b) a first means for selectively holding a valve of said cylinder continuously closed;

(c) a second means for selectively holding a valve of said cylinder continuously open; and (d) a clutch to permit mode selection within said first or second means, said clutch comprising:

(i) a clutch control member (15, 32, 85, 102) having at least two cross-sections, said clutch control member being associated with one of the components of each of said push rods;

(ii) means (14, 31, 84, 101) for moving said clutch member relative to the component of the push rod with which it is associated;

(iii) a clutch member (5, 27, 75, 97) carried fixedly by one of the components of each of said push rods and in sliding engagement with said clutch control member, said clutch member having perforations therethrough;

(iv) a compressive-load bearing member (12, 25, 89, 95) in sliding engagement with said clutch member (5, 27, 75, 97), said compressive-load bearing member having at least one relief in the surface thereof in sliding engagement with said clutch member, said at least one relief being positioned adjacent the perforation in said clutch member, (v) shear resistant member (7, 34, 77, 104) located in perforations in said clutch member and sized to extend into the relief(s) in said compressive load bearing member when said clutch member is in a first position; and (vi) a resilient member (17, 26, 87, 96) biasing the two coaxial components of said push rods away from each other, said resilient member having strength insufficient to overcome the strength of the associated valve spring, whereby (vii) when said clutch control member is positioned in its first position, said shear resistant members are forced into the reliefs in said compressive load bearing member; and (viii) when said clutch control member is positioned in a position other than its first position, said shear resistant member can move out of the relief(s) in said compressive load bearing member.

6. The engine of claim 5 wherein (a) said compressive load bearing member (12, 25) is slidingly received within said clutch member (5, 27) and (b) said clutch member (5, 27) is slidingly received within said clutch control member (15, 32).

7. The engine of claim 6 wherein (a) said compression load bearing member (12) is carried fixedly by one of the coaxial components (4) of said push rods and (b) said resilient member (17) is disposed between said clutch member (5) and said compression load bearing member (12).

8. The engine of claim 6 wherein (a) said compression load bearing member (25) is fixed relative to the associated cylinder and (b) said resilient member (26) is disposed between said clutch member (27) and one of the coaxial components (23) of said push rods.

9. The engine of claim 5 wherein (a) said clutch control member (85, 102) is slidingly received within said clutch member (75, 97) and (b) said clutch member (75, 97) is slidingly received within said compression load bearing member (89, 95).

10. The engine of claim 9 wherein (a) said compression load bearing member (89) is carried fixedly by one of the coaxial components (74) of said push rods;

(b) said resilient member (87) is disposed between said compression load bearing member (89) and the other one of the coaxial component (80); and (c) said clutch member (75) is carried fixedly by said other one of the coaxial components (80) of said push rods.

11. The engine of claim 9 wherein (a) said compression load bearing member (95) is fixed relative to the associated cylinder;

(b) said resilient member (96) is disposed between said clutch member (97) and one of the coaxial components (93) of said push rods;

(c) said clutch member (97) is carried fixedly by the other one of the coaxial components (98) of said push rods.

12. The engine of claim 5 wherein said means (14, 31, 84, (101) for moving said clutch control members (15, 32, 85, 102) move them axially relative to the components of the push rod with which they are associated.

13. The engine of claim 5 wherein said clutch control members (15, 32, 85, 102), said clutch members (5, 27, 75, 97), and said compressive load bearing member (12, 25, 89, 95) are all cylindrical in shape.

14. The engine of claim 5 wherein said shear resistant members are balls.

* * * * *